United States Patent
Oishi

(10) Patent No.: US 10,497,093 B2
(45) Date of Patent: Dec. 3, 2019

(54) IMAGE PROCESSING APPARATUS FOR MINIMIZING DETERIORATION OF IMAGE QUALITY OF A RAW IMAGE

(71) Applicant: CANON KABUSHIKI KAISHA, Tokyo (JP)

(72) Inventor: Akihiro Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 15/718,672

(22) Filed: Sep. 28, 2017

(65) Prior Publication Data
US 2018/0096456 A1 Apr. 5, 2018

(30) Foreign Application Priority Data

Sep. 30, 2016 (JP) ................................. 2016-194771

(51) Int. Cl.
| | | |
|---|---|---|
| *G06T 3/40* | (2006.01) | |
| *H04N 1/21* | (2006.01) | |
| *H04N 9/04* | (2006.01) | |
| *G06T 5/00* | (2006.01) | |
| *H04N 101/00* | (2006.01) | |

(52) U.S. Cl.
CPC ............ *G06T 3/4015* (2013.01); *G06T 5/009* (2013.01); *H04N 1/2112* (2013.01); *H04N 9/045* (2013.01); *G06T 2207/10024* (2013.01); *H04N 2101/00* (2013.01)

(58) Field of Classification Search
CPC .................. G06T 3/4015; G06T 5/009; G06T 2207/10024; H04N 1/2112; H04N 9/045; H04N 2101/00
See application file for complete search history.

(56) References Cited

U.S. PATENT DOCUMENTS

| | | | | |
|---|---|---|---|---|
| 2003/0048360 A1* | 3/2003 | Herley | ................. | H04N 1/2112 348/222.1 |
| 2003/0052979 A1* | 3/2003 | Soga | .................... | H04N 1/2112 348/241 |
| 2008/0158375 A1* | 7/2008 | Kakkori | .................... | G06T 1/20 348/222.1 |
| 2010/0254630 A1* | 10/2010 | Ali | ........................ | G06T 3/4053 382/300 |
| 2010/0328442 A1* | 12/2010 | Yang | .................. | G06K 9/00234 348/77 |

(Continued)

FOREIGN PATENT DOCUMENTS

JP 2000-152240 A 5/2000

*Primary Examiner* — Ming Y Hon
(74) *Attorney, Agent, or Firm* — Canon U.S.A., Inc. IP Division

(57) ABSTRACT

An image processing apparatus includes a development processing unit configured to perform development processing for a first RAW image, an output unit configured to output the first RAW image subjected to the development processing, a RAW compression unit configured to compress a second RAW image and generate the second RAW image which remains compressed, and a control unit configured to write the compressed second RAW image into a storage medium, wherein the first RAW image and the second RAW image are respectively images obtained from the same RAW image, and a level of pixels in a dark portion in the second RAW image has been more raised than that in the first RAW image.

11 Claims, 5 Drawing Sheets

(56) References Cited

U.S. PATENT DOCUMENTS

| | | | | |
|---|---|---|---|---|
| 2013/0021442 A1* | 1/2013 | Okamoto | ............... | G02B 7/36 |
| | | | | 348/46 |
| 2014/0198226 A1* | 7/2014 | Lee | ............... | H04N 5/2355 |
| | | | | 348/208.1 |
| 2015/0054973 A1* | 2/2015 | Velichko | ............... | H04N 5/369 |
| | | | | 348/218.1 |
| 2015/0130965 A1* | 5/2015 | Oishi | ............... | H04N 19/124 |
| | | | | 348/223.1 |
| 2017/0154412 A1* | 6/2017 | Tatsumi | ............... | G06T 5/009 |

\* cited by examiner

IMAGE PROCESSING APPARATUS FOR MINIMIZING DETERIORATION OF IMAGE QUALITY OF A RAW IMAGE

BACKGROUND OF THE INVENTION

Field

The present invention relates to an image processing apparatus, an image processing method, and a storage medium.

Description of the Related Art

An image encoding/decoding apparatus performs debayer processing (demosaic processing) for raw image information (a RAW image) captured by an image sensor and converts the raw image information into a luminance signal and a color difference signal, to perform development processing such as noise reduction, optical distortion correction, and image optimization for each of the signals. The luminance signal and the color difference signal, which have been subjected to the development processing, are generally compressed and encoded to be recorded on a storage medium.

On the other hand, an apparatus capable of recording a RAW image also exists. An amount of data required to record the RAW image becomes enormous. However, the RAW image has advantages such that correction and deterioration of the RAW image from an original image are kept to a minimum, and the RAW image can be edited after being captured. Therefore, the RAW image has been preferably used by an experienced person. However, the amount of data required to record the RAW image is desired to be suppressed so that the RAW image can be recorded as much as possible on a limited storage medium because it is enormous. Thus, the RAW image is compressed to suppress the amount of data. However, an image quality of the RAW image may deteriorate by compression processing depending on an image capturing condition.

Japanese Patent Application Laid-Open No. 2000-152240 proposes a technique for changing quantization depending on a characteristic of a human visual system to suppress image quality deterioration.

SUMMARY

The present invention is directed to providing a technique for suppressing, even if a RAW image is compressed, deterioration in an image quality of the RAW image by adjustment of the RAW image.

According to an aspect of the present invention, there is provided an image processing apparatus including a development processing unit configured to perform development processing for a first RAW image, an output unit configured to output the first RAW image subjected to the development processing, a RAW compression unit configured to compress a second RAW image and generate the second RAW image which remains compressed, and a control unit configured to write the compressed second RAW image into a storage medium, wherein the first RAW image and the second RAW image are respectively images obtained from the same RAW image, and a level of pixels in a dark portion in the second RAW image has been more raised than that in the first RAW image.

According to the present invention, even if the RAW image is compressed, the deterioration in the image quality of the RAW image can be suppressed by the adjustment of the RAW image.

Further features of the present invention will become apparent from the following description of exemplary embodiments with reference to the attached drawings.

DESCRIPTION OF THE EMBODIMENTS

Figure 1:
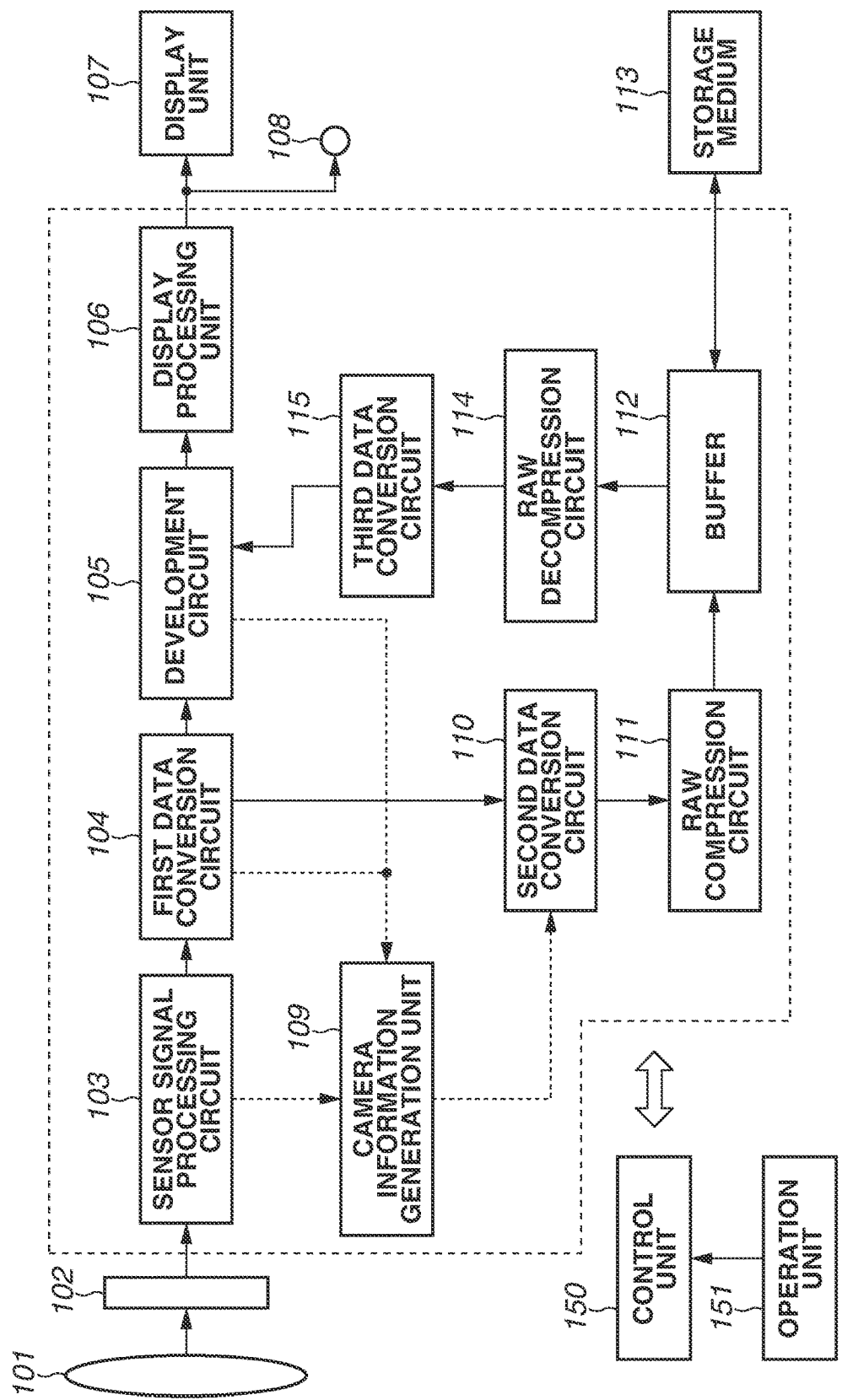
FIG. 1 is a block diagram illustrating a configuration example of an image processing apparatus according to a first exemplary embodiment of the present invention.

Referring to the drawings, a first exemplary embodiment of the present invention will be specifically described below. FIG. 1 is a block diagram illustrating a configuration example of an image processing apparatus 100 according to the first exemplary embodiment of the present invention.

The image processing apparatus 100 can be implemented as a digital camera or a digital video camera, for example. In addition thereto, the image processing apparatus 100 can also be implemented as any information processing terminal or an image capturing apparatus such as a personal computer, a mobile phone, a smartphone, a Personal Digital Assistant (PDA), a tablet terminal, and a portable media player. FIG. 1 illustrates a configuration including an image sensor 102, considering a case where the image processing apparatus 100 functions as a digital camera, for example. However, as an exemplary embodiment of the present invention, the image processing apparatus 100 may be implemented by a configuration not including the image sensor 102 as an image encoding/decoding apparatus, an image recording apparatus, or an image compression apparatus capable of compressing and recording a RAW image.

In the configuration of the image processing apparatus 100 illustrated in FIG. 1, each of blocks, excluding physical devices such as an image sensor and a display element, may be configured in a hardware manner using a dedicated logic circuit or a memory. Alternatively, each of the blocks may be configured in a software manner by a computer such as a central processing unit (CPU) executing a processing program stored in the memory.

In FIG. 1, a control unit 150 controls the entire image processing apparatus 100, and includes a CPU, a read-only memory (ROM) storing a program to be executed by the CPU, and further a random access memory (RAM) used as a work area. The control unit 150 is connected to an operation unit 151 which receives an instruction input from a user.

In the illustrated configuration, when the user inputs an image capturing instruction via the operation unit 151, an optical image of an object to be captured is input via an image capturing optical unit 101 such as an imaging lens and is formed on the image sensor 102 under the control of the control unit 150. The image sensor 102 converts light, which has been transmitted by a red-green-blue (RGB) color filter arranged for each of pixels, into an electrical signal.

Figure 2A:
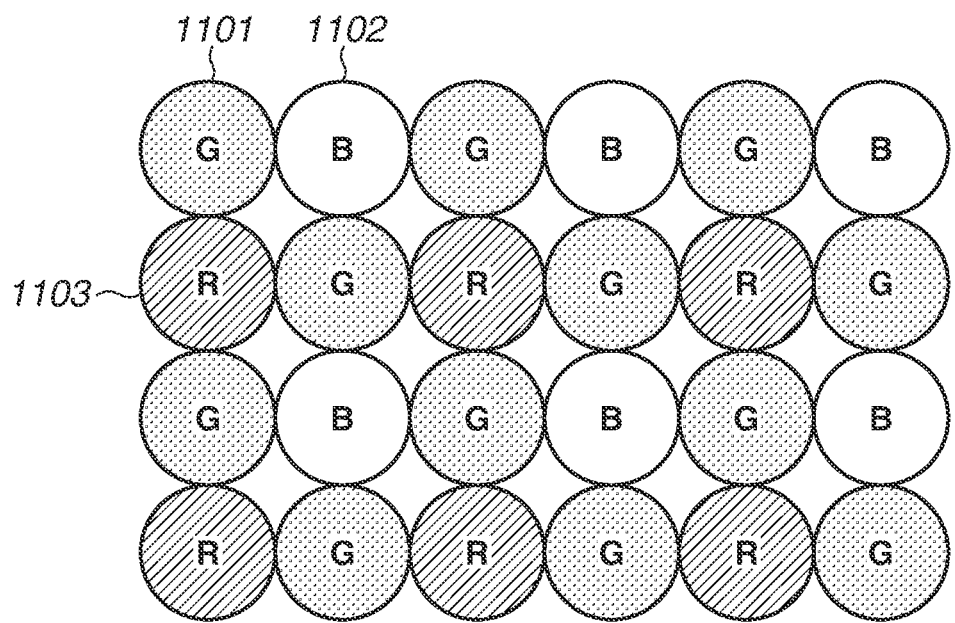
FIGS. 2A and 2B are respectively a diagram illustrating a pixel array and a diagram of sub-band formation in wavelet conversion.

An example of the color filter is illustrated in FIG. 2A. FIG. 2A illustrates an example of the color filter arranged in the image sensor 102, and represents an array of pixels in an image handled by the image processing apparatus 100. As illustrated in FIG. 2A, red (R), green (G), and blue (B) colors are arranged in a mosaic shape for each of the pixels, and one red pixel, one blue pixel, and two green pixels are regularly arranged as one set for the four (two by two) pixels. Such an array of the pixels is generally referred to as a Bayer array.

The electrical signal obtained by the conversion by the image sensor 102 is subjected to pixel restoration processing by a sensor signal processing circuit 103. The restoration processing includes processing for interpolating a value of a pixel to be restored, i.e., a missing pixel or a pixel with low reliability in the image sensor 102 using peripheral pixel values and for subtracting a predetermined offset value from a value of the pixel. In the present exemplary embodiment, an image output from the sensor signal processing circuit 103 is referred to as a RAW image meaning a raw (undeveloped) image.

Figure 3A:
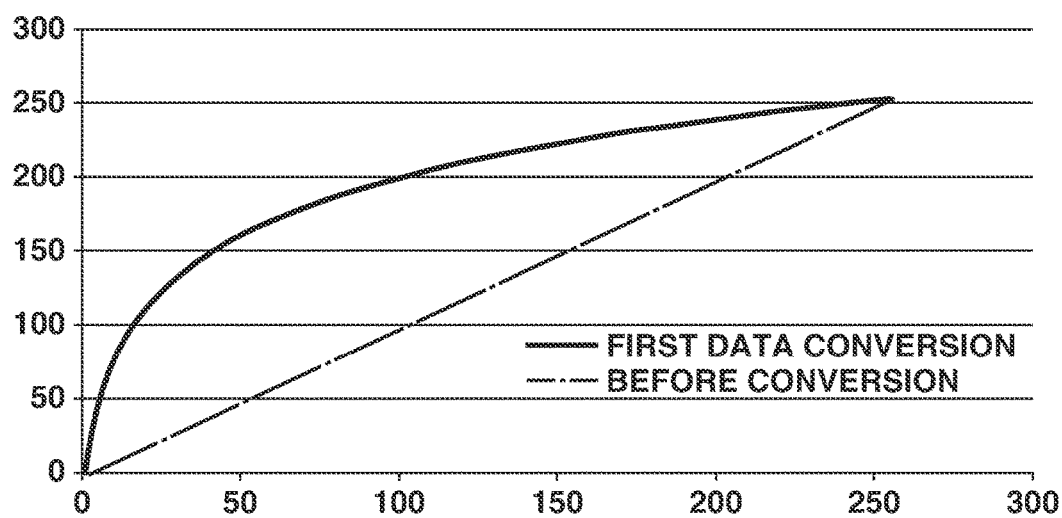
FIGS. 3A and 3B are graphs each illustrating an example of non-linear conversion serving as first data conversion and second data conversion according to the first exemplary embodiment of the invention.

The RAW image output from the sensor signal processing circuit 103 is supplied to a first data conversion circuit 104 and a camera information generation unit 109. The first data conversion circuit 104 performs data conversion for the input RAW image. The data conversion performed by the first data conversion circuit 104 is nonlinear conversion (first data conversion) for ensuring a dynamic range and changing the RAW image into data appropriate for display and editing. In the present exemplary embodiment, Log conversion is used as the nonlinear conversion. FIG. 3A is a graph illustrating the nonlinear conversion in the first data conversion circuit 104 corresponding to the exemplary embodiment of the invention. A solid line indicates an input-output relationship in first data conversion, and a one-dot and dash line indicates an input-output relationship before the conversion. The first data conversion circuit 104 converts a value of each of the pixels in the RAW image to be processed according to a following equation 1:

$$y_1 = a \cdot \text{Log } 10(b \cdot x + c) + d \qquad \text{Equation 1}$$

In the equation 1, x represents a value of each of the pixels in the RAW image output from the sensor signal processing circuit 103, y represents a value of the pixel after the Log conversion, and each of a, b, c, and d is a predetermined fixed value and can be set as a real number. More specifically, a is a parameter for determining a range which the value after the conversion can take, b is a parameter for determining the degree of rise of a value of the pixel in a dark portion in the RAW image. The larger a value of the parameter b is, the steeper the rise of the value of the pixel in the dark portion becomes. Further, c is a parameter exerted to mainly determine an initial value, and d is a parameter for totally adjusting the value after the conversion.

The first data conversion circuit 104 holds a conversion table corresponding to FIG. 3A, and can determine a value of each of pixels in a RAW image input based on the conversion table. In the graph illustrated in FIG. 3A, a vertical axis represents a value of the pixel in the RAW image before the conversion, and a horizontal axis represents a value of the pixel in the RAW image after the conversion. In the present exemplary embodiment, the RAW image may be any number of bits in width, although it is represented by 8-bit data (each of the pixels can take any one of values 0 to 255). In the present exemplary embodiment, an image after the conversion is a RAW image. By the first data conversion, a small value in a dark portion is raised with respect to an original value indicated by the one-dot and dash line in FIG. 3A while a large value in a high-luminance portion is laid in a range not reaching a maximum value (255 in eight bits).

Referring to FIG. 1 again, the first data conversion circuit 104 supplies the RAW image (first RAW image) after the conversion to each of a development circuit 105 and a second data conversion circuit 110. The development circuit 105 performs development processing for the input RAW image. The development circuit 105 performs development processing, e.g., performing debayer processing (demosaic processing) and performing white balance adjustment for the RAW image, converting the RAW image into a luminance signal and a color difference signal, removing noise included in each of the signals and correcting optical distortion for the signal, and performing gamma correction corresponding to an output characteristic of a display unit 107 to optimize the RAW image.

Either the RAW image from the first data conversion circuit 104 or a RAW image from a third data conversion circuit 115 is input to the development circuit 105. In the case of through display (live view) in which the RAW image captured by the image sensor 102 is displayed on the display unit 107 simultaneously with being captured, the RAW image from the first data conversion circuit 104 is input to the development circuit 105. In a case where the RAW image stored in a storage medium 113 is displayed on the display unit 107 in response to a user operation for the operation unit 151, the RAW image from the third data conversion circuit 115 is input to the development circuit 105.

Image information, which has been subjected to the development processing by the development circuit 105, is displayed on the display unit 107 via a display processing unit 106. The image information, which has been subjected to the development processing, may be output to a display apparatus connected to the outside by a video output terminal 108. The video output terminal 108 includes a general-purpose interface such as a High-Definition Multimedia Interface (HDMI) or a Single Document Interface (SDI). The image information, which has been subjected to the development processing, may be supplied to an image processing circuit (not illustrated), compressed and encoded to be converted into an image in another format such as a Joint Photographic Experts Group (JPEG) image, although description thereof is omitted for simplicity in FIG. 1. The JPEG image generated by the image processing circuit can be stored in the storage medium 113.

The camera information generation unit 109 acquires the RAW image from each of the sensor signal processing circuit 103, the first data conversion circuit 104, and the development circuit 105, and generates camera information based on information about a level average value and a histogram calculated for any rectangular block. The camera information can include respective ranges of a dark portion, an intermediate portion, and a high-luminance portion in the RAW image. The camera information generation unit 109 supplies the generated camera information and the RAW image acquired from the sensor signal processing circuit 103 to the second data conversion circuit 110.

The second data conversion circuit 110 performs data conversion appropriate for compression processing in a RAW compression circuit 111 in the succeeding stage for the RAW image supplied from the first data conversion circuit 104 based on the camera information and the RAW image input from the camera information generation unit 109. Details of data conversion in the second data conversion circuit 110 will be described below. The second data conversion circuit 110 supplies a RAW image obtained by the data conversion to the RAW compression circuit 111.

The RAW compression circuit 111 performs compression processing for the supplied RAW image. Generally, information about a high-frequency component is difficult to be visually recognized even if reduced in the compression processing. Thus, encoding efficiency is known to be better when the RAW image is decomposed into a high-frequency component and a low-frequency component by wavelet conversion and information about the higher-frequency component is compressed.

Figure 2B:
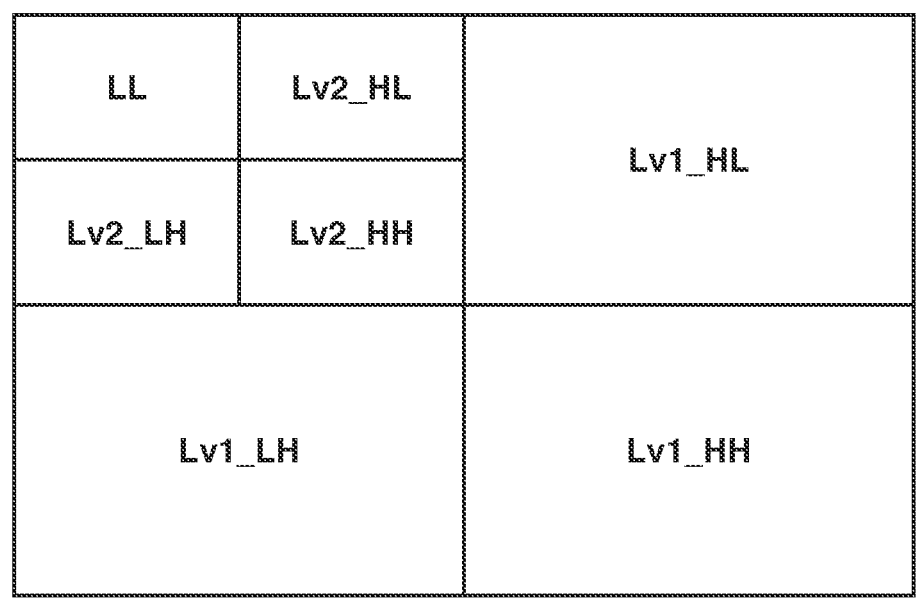

FIG. 2B is a diagram of sub-band formation in the case of a decomposition level 2 at which each of vertical filtering and horizontal filtering is performed two times in wavelet conversion. In FIG. 2B, Lv1 represents a high-frequency component. Therefore, information about the high frequency component Lv1 is reduced by quantization. In the RAW compression circuit 111, a coefficient output by the wavelet conversion is high-efficiency encoded using techniques such as quantization, difference encoding, and entropy encoding, and is converted into a RAW file which remains compressed. In this case, the control unit 150 also performs processing for including information required for decoding in a header of the RAW file.

Details of an operation of the second data conversion circuit 110 will be described below. When the RAW image is displayed or converted into a file in another format (e.g., a JPEG image file), development processing and image adjustment can be implemented. In the development processing and the image adjustment, gradation correction is performed to suppress underexposure and overexposure. To suppress underexposure, processing for determining a black level and further performing gradation correction to particularly raise the dark portion is performed. Accordingly, if a compression error has occurred in the dark portion by RAW compression, the dark portion is raised by the development processing so that the compression error is increased or emphasized. The compression error occurring in the dark portion by the RAW compression may occur on the following principle.

When compression processing for quantizing a wavelet coefficient output by wavelet conversion is performed, for example, the wavelet coefficient tends to be substantially low since a signal level is low in the dark portion. Further, when the wavelet coefficient is low, the wavelet coefficient becomes zero by being quantized so that information may be lost. In this case, a pixel value in the dark portion is crushed by RAW compression so that resolution in the dark portion is not obtained. When processing for further raising the dark portion by development processing is performed for such an image, the compression error may be emphasized, as described above.

In the present exemplary embodiment, prior to the compression processing in the RAW compression circuit 111, data conversion for reducing the compression error in the dark portion is performed. More specifically, the signal level in the dark portion in the RAW image after the conversion obtained by the first data conversion circuit 104 is further raised, and a coefficient 0 is inhibited from occurring by the quantization. In the case, the signal level in the high-luminance portion is laid to fall below a maximum value and is inhibited from being stuck (clipped) to the maximum value to suppress overexposure.

In the compression processing for quantizing the wavelet coefficient output by the wavelet conversion, the wavelet coefficient tends to be substantially high since the signal level in the high-luminance portion is high. Even if the wavelet coefficient is quantized when high, a code amount increases. Thus, the data conversion is performed, the signal level is laid, and a generated code amount by the quantization is suppressed.

The second data conversion circuit 110 converts a value of each of pixels in a RAW image to be processed according to a following equation 2. The RAW image to be processed is the RAW image output by the sensor signal processing circuit 103. The RAW image to be processed may be supplied from the camera information generation unit 109, as described above.

$$y_2 = f \cdot \text{Log } 10(g \cdot x + h) + i \qquad \text{Equation 2}$$

In the equation, each of parameters f, g, h, and i is any real number. The parameters f, g, h, and i respectively have properties corresponding to the parameters a, b, c, and d in the equation 1.

The second data conversion circuit 110 combines (adds) results respectively obtained by the equation 1 and the equation 2, and outputs a combining result to perform second data conversion. This corresponds to addition of a conversion result based on the equation 2 to an execution result of the first data conversion in the first data conversion circuit 104 and output of an addition result. Alternatively, this can also be restated as correcting the execution result of the first data conversion based on the equation 2. The second data conversion circuit 110 corrects, modifies, or adjusts the conversion result in the first data conversion circuit 104, and the degree of the correction, modification, or adjustment can be controlled using the parameters included in the aforementioned equation 2.

In the present exemplary embodiment, the second data conversion circuit 110 acquires respective information about ranges of the dark portion, the intermediate portion, and the high-luminance portion in the RAW image as the camera information from the camera information generation unit 109. Accordingly, the second data conversion circuit 110 can adjust respective values of the parameters depending on which of the dark portion, the intermediate portion, and the high-luminance portion the value of the pixel to be processed belongs to. In a case where each of the pixels in the RAW image takes any value in the range of 0 to 255 in eight bits, the rise in a value of the pixel having a low level belonging to the dark portion can be controlled by adjusting the parameter g corresponding to the above-described parameter b. The larger the parameter g is, the larger the rise in the dark portion becomes, and accordingly the larger the degree of adjustment (a correction amount) of a first data conversion result becomes.

Accordingly, the second data conversion circuit 110 can make, in a case where it is determined that the value of the pixel to be processed belongs to the dark portion by the camera information acquired from the camera information generation unit 109, the value of the parameter g larger than that in the other cases. When the parameters in the dark portion, the intermediate portion, and the high-luminance portion are respectively g1, g2, and g3, for example, g1>g2>g3 can be satisfied. A ratio of the dark portion, the intermediate portion, and the high-luminance portion may be determined in units of blocks for compression processing, and the value of the parameter g may be determined depending on the ratio.

As the other parameters, the parameter f (corresponding to the parameter a in the equation 1), for example, may be a parameter for defining a range which a value after conversion can take or may be a fixed value. Further, the parameters h and i may be respectively similarly fixed values.

The second data conversion circuit 110 combines the results respectively obtained by the equation 1 and the equation 2, and supplies a combining result to the RAW compression circuit 111. The combining result can be approximated as a following equation 3:

$$y_1+y_2=Y=a \, \text{Log} \, 10(b \cdot x+c)+d+f \, \text{Log} \, 10(g \cdot x+h)+ i \approx j \cdot \text{Log} \, 10(k \cdot x^2+m \cdot x+n)+p \quad \text{Equation 3}$$

In the equation, each of coefficients k, m, and n is a value used when $k \cdot x^2+m \cdot x+n$ is substituted for $(b \cdot x+c) \cdot (g \cdot x+h)$, p is a value substituted for (d+i), and j is a coefficient set so that y becomes a maximum value when x is a maximum value. A maximum value of Y is at a white level.

Figure 3B:
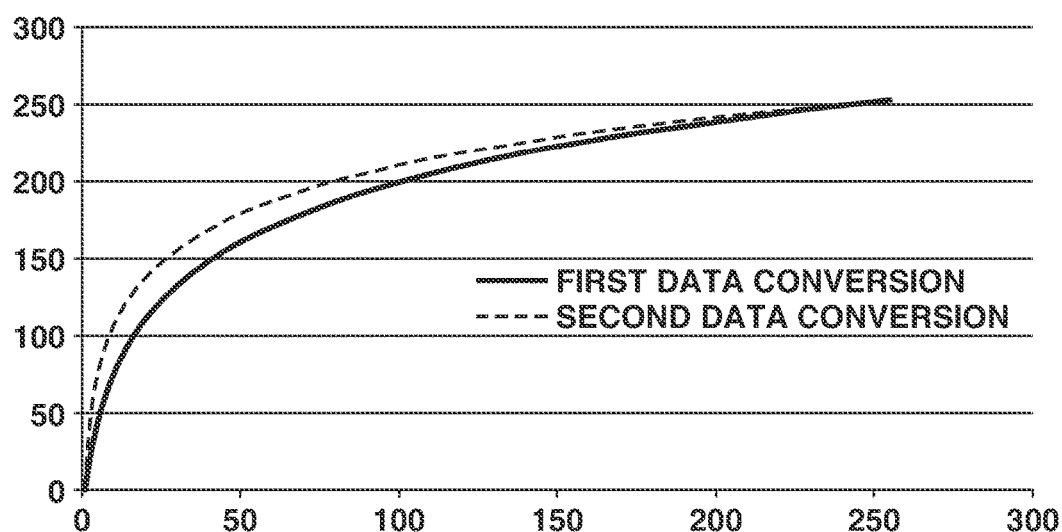

FIG. 3B is a graph illustrating comparison between input/output relationships in the first data conversion and the second data conversion. A solid line indicates the input/output relationship in the first data conversion, and a broken line indicates the input/output relationship in the second data conversion. A value of each of pixels in a RAW image after the conversion represented by the vertical axis after the second data conversion by the second data conversion circuit 110 is larger than that after the first data conversion. Particularly, the value before the conversion, which reaches 150 after the conversion, is approximately 50 in the first data conversion while being a half of it, i.e., approximately 25 in the second data conversion. Therefore, the rise in the dark portion in the second data conversion is steeper than that in the first data conversion. Thus, the signal level becomes high even in the dark portion, so that the decrease in a wavelet coefficient is solved and a coefficient 0 can be inhibited from occurring in quantization processing.

The second data conversion circuit 110 holds a conversion table corresponding to FIG. 3B, and can determine a value of each of pixels in a RAW image input based on the conversion table. As the conversion table corresponding to FIG. 3B, tables in a plurality of patterns corresponding to camera information, e.g., a table applied to a block having a high percentage of a dark portion and a table applied to a block having a high percentage of a high-luminance portion can be prepared.

Referring to FIG. 1 again, the processing will be described. The RAW compression circuit 111 performs compression processing for the RAW image after the conversion output from the second data conversion circuit 110. In the present exemplary embodiment, wavelet conversion (one type of frequency conversion) is performed. In the wavelet conversion, the RAW image is decomposed into sub-bands, and a sub-band coefficient is output for each of the sub-bands. The output sub-band coefficient is high-efficiency encoded using techniques such as quantization and entropy encoding, and is converted into a RAW file which remains compressed. In this case, the control unit 150 also performs processing for including information required for decoding in a header of the RAW file.

Figure 4A:
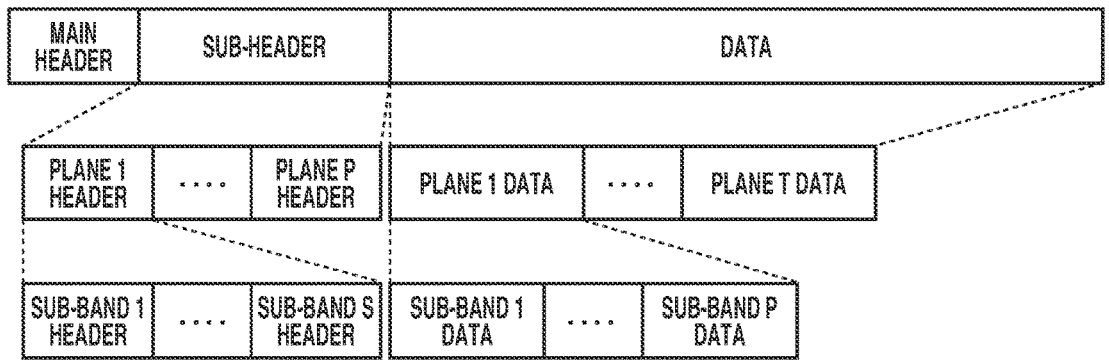
FIGS. 4A, 4B, 4C, and 4D are diagrams respectively illustrating examples of data structures of a file format, a main header portion, a plane header portion, and a sub-band header portion according to the first exemplary embodiment of the invention.

FIG. 4A illustrates an example of a file format of the RAW file. In FIG. 4A, the RAW file is divided into a header portion and a data portion, and the header portion includes a main header portion and a sub-header portion. The sub-header portion includes a plurality of plane header portions, and each of the plane header portions includes a plurality of sub-band header portions. The data portion includes a plurality of plane data, and each of the plane data includes a plurality of sub-band data. The plane header and the sub-band header respectively include information corresponding to the plane data and the sub-band data.

Figure 4B:
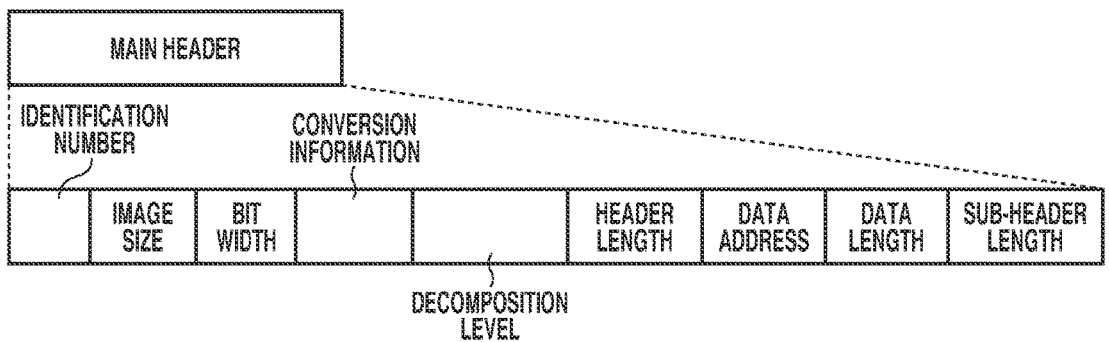
Figure 4C:
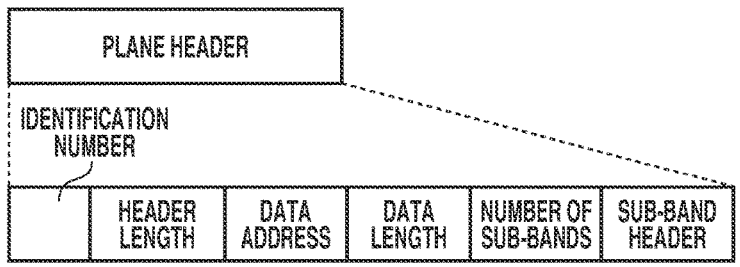
Figure 4D:
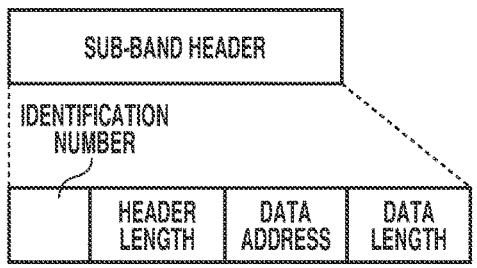

FIG. 4B illustrates an example of a data structure of the main header portion. The main header portion includes an identification number, an image size, a bit width of an image, data conversion information, a decomposition level in wavelet conversion, a header length, an address of a data portion, a data length, and a sub-header length. The data conversion information can include any real numbers f, g, h, and i used in the equation 2 or k, m, n, and p used in the equation 3. Alternatively, when a predetermined table is used, information for specifying the table can be included. FIG. 4C illustrates an example of a data structure of the plane header portion. The plane header portion includes a plane header identification number, a header length, an address and a data length of the data portion, the number of sub-bands, and a sub-band header. FIG. 4D illustrates an example of a data structure of the sub-band header portion. The sub-band header portion includes an identification number, a header length, and an address and a data length of the data portion.

Referring to FIG. 1 again, the RAW file output from the RAW compression circuit 111 is held in a buffer 112. The control unit 150 writes the RAW file held in the buffer 112 into the storage medium 113. The storage medium 113 is a built-in type large capacity memory or a hard disk, or a removable memory card. Further, the storage medium 113 may be a storage device via a network.

When a reproduction instruction to reproduce and display the RAW file by the display unit 107 via the operation unit 151 is received from the user, the control unit 150 reads out the RAW file, which has been designated by the user, from the storage medium 113 and writes the read RAW file into the buffer 112. A RAW decompression circuit 114 reads out the RAW file stored in the buffer 112, and decodes and decompresses the compressed RAW file. The RAW image obtained by the decompression by the RAW decompression circuit 114 is input to the third data conversion circuit 115. The third data conversion circuit 115 reads out data conversion information described in a file header, and performs inverse conversion processing.

The second data conversion in the second data conversion circuit 110 is processing performed to perform RAW compression. Thus, the RAW image after the second data conversion is returned to the RAW image at the time of the first data conversion by the first data conversion circuit 104 using the inverse conversion processing to display the RAW image in the display unit 107. Thus, the processing in the development circuit 105 need not be switched regardless of whether through display has been performed or the RAW file is read out from the storage medium 113 and displayed. The RAW image is prevented from being differently displayed depending on a processing path.

The inverse conversion performed by the third data conversion circuit 115 is processing for subtracting a value corresponding to a difference between the RAW image by the first data conversion (the first RAW image) and the RAW image by the second data conversion (the second RAW image) from the second RAW image to obtain the first RAW image. More specifically, the inverse conversion is processing for returning data calculated by the equation 3 to data calculated in the equation 1. When the equation 1 is represented by Log A, and the equation 2 is represented by Log B, an equation 3, i.e., Log A+Log B, can be represented by Log(A*B). When the equation 3 is represented by Log C, the inverse conversion from the equation 3 to the equation 1 is (Log A+Log B)−Log B i.e., Log(C/B), and processing for the inverse conversion may be performed. Alternatively, an inverse conversion table may be previously prepared. A RAW image obtained by the inverse conversion is input to the development circuit 105. Description of the development circuit 105 and the succeeding components is as described above.

As described above, the image processing apparatus according to the present exemplary embodiment can inhibit, by correcting a value of each of pixels in a RAW image depending on a feature of the RAW image when compression processing is performed for the RAW image, a compression error from occurring by the compression processing. Particularly in the present exemplary embodiment, first data conversion for generating a RAW image for display and second data conversion for converting the RAW image for display into a RAW image for recording are performed, and conversion parameters are adjusted depending on a feature of the RAW image to be converted in the second data conversion. Thus, the compression error can be effectively inhibited from occurring by the compression processing depending on the feature of the RAW image. Particularly, the compression error can be inhibited from occurring in a dark portion in the RAW image. As a result, even when a RAW file stored in the storage medium 113 is reproduced, display similar to through display at the time of image capturing can be performed.

In the above-described exemplary embodiment, a dedicated circuit has been used as each of the sensor signal processing circuit 103, the first data conversion circuit 104, the development circuit 105, the second data conversion circuit 110, the RAW compression circuit 111, the RAW decompression circuit 114, and the third data conversion circuit 115. However, a general-purpose processor, which has been programmed, may be used. Respective functions of the plurality of circuits, described above, may be implemented by one general-purpose processor, or may be implemented by a plurality of general-purpose processors.

Figure 5:
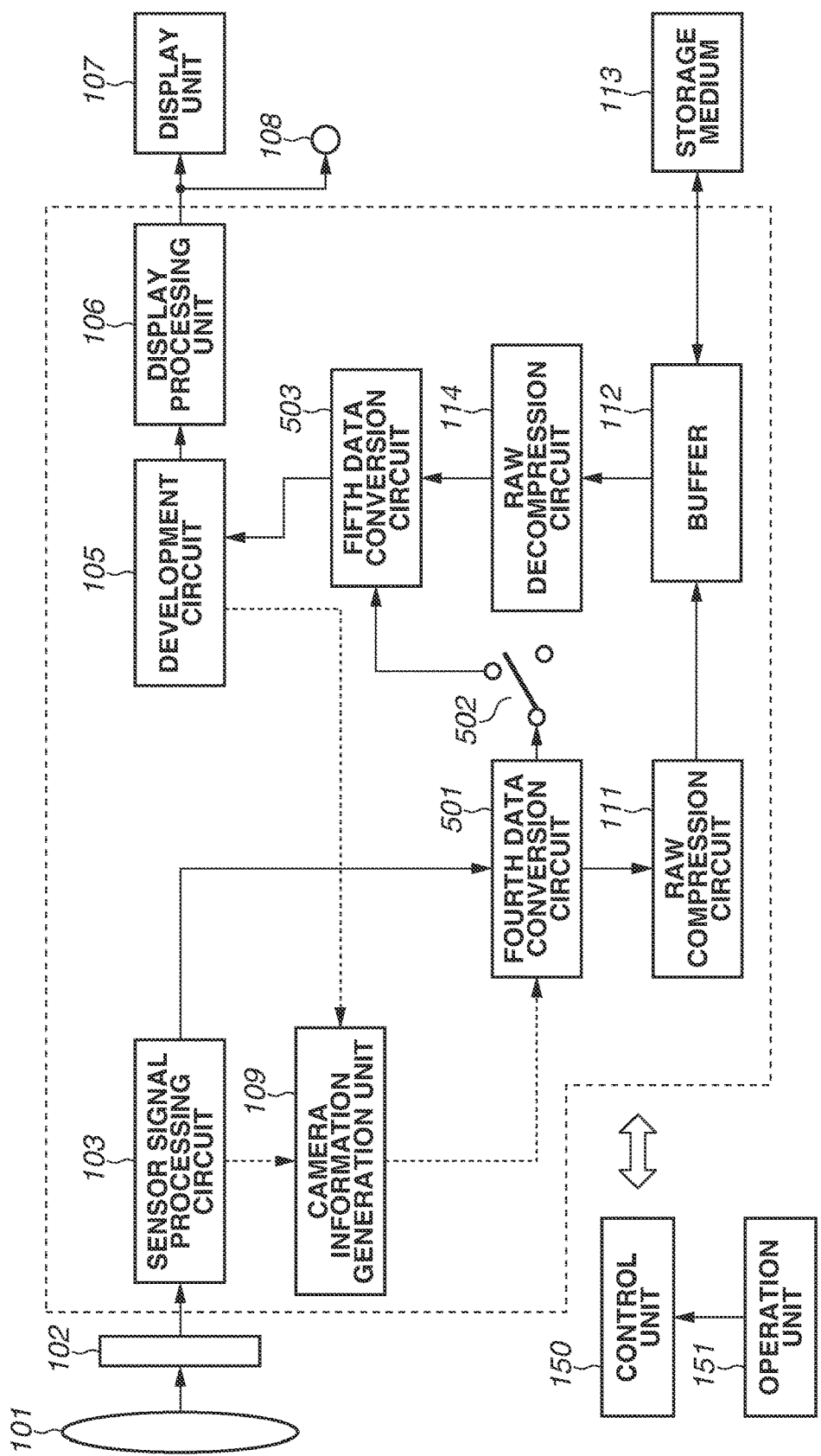
FIG. 5 is a block diagram illustrating a configuration example of an image processing apparatus according to a second exemplary embodiment of the present invention.

FIG. 5 is a block diagram illustrating a configuration example of an image forming apparatus according to a second exemplary embodiment of the present invention. In FIG. 5, the same components as those illustrated in FIG. 1 used in the above-described first exemplary embodiment are respectively assigned the same numbers. Overall processing is similar to that in the first exemplary embodiment, and thus portions, which differ in processing from those in the first exemplary embodiment, will be described below.

A RAW image output from a sensor signal processing circuit 103 is input to a fourth data conversion circuit 501. The fourth data conversion circuit 501 performs data conversion corresponding to the equation 3 in the first exemplary embodiment. The RAW image converted by the fourth data conversion circuit 501 is input to a RAW compression circuit 111. Further, the RAW image is input to a fifth data conversion circuit 503 via a switch 502. The fifth data conversion circuit 503 performs a similar operation to that of the third data conversion circuit 115 illustrated in FIG. 1. The RAW image input to the fifth data conversion circuit 503 is converted into a value corresponding to the equation 1 described in the first exemplary embodiment. The fifth data conversion circuit 503 inputs the generated RAW image to a development circuit 105.

In a case where the switch 502 is turned on, writing into a storage medium 113 via the RAW compression circuit 111 and a buffer 112 and through display via the fifth data conversion circuit 503, the development circuit 105, a display processing unit 106, and a display unit 107 can be simultaneously implemented. In a case where the switch 502 is turned off, power consumption can also be suppressed by performing only recording into the storage medium 113. In a case where a RAW file read out from the storage medium 113 is displayed on a display unit 107 based on a user operation for an operation unit 151, the switch 502 can also be turned off.

In the present exemplary embodiment, an image quality of a RAW image can also be inhibited from deteriorating by compression processing as data considering image adjustment by development processing when data conversion for the RAW image is performed depending on camera information.

OTHER EMBODIMENTS

The present invention can also be implemented by processing for storing a program for implementing one or more functions in the above-described exemplary embodiments in a non-transitory computer-readable storage medium and reading out the program from the non-transitory computer-readable storage medium by one or more processors in a computer in a system or an apparatus. The present invention can also be implemented by a circuit (e.g., an Application Specific Integrated Circuit (ASIC)) which implements one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194771, filed Sep. 30, 2016, which is hereby incorporated by reference herein in its entirety.

What is claimed is:

1. An image processing apparatus comprising:
   at least one processor; and
   a memory storing a program which, when executed by the at least one processor, causes the image processing apparatus to:
   a first conversion converting a RAW image output from an image capturing unit and generate a first RAW image;
   perform development processing for the first RAW image;
   output an image developed;
   a second conversion converting the RAW image output from the image capturing unit and generate a second RAW image;
   compress the second RAW image and generate the compressed second RAW image; and
   write the compressed second RAW image into a storage medium,
   wherein the first RAW image and the second RAW image are respectively images obtained from the same RAW image, and a level of pixels in a dark portion in the second RAW image has been more raised than that in the first RAW image,
   wherein a conversion result for the RAW image output from the image capturing unit is combined with the first RAW image, to generate the second RAW image, and wherein a degree to which the level of the pixels in the dark portion is raised by the first conversion is lower than a degree to which the level of the pixels in the dark portion by the second conversion.

2. The image processing apparatus according to claim 1, wherein the second conversion changes the degree to which the level of the pixels in the dark portion is raised depending on a feature of the RAW image output from the image capturing unit.

3. The image processing apparatus according to claim 2, wherein the second conversion increases the degree to which the level of the pixels in the dark portion is raised as a ratio of the dark portion to the RAW image output from the image capturing unit increases.

4. The image processing apparatus according to claim 1, further comprising
decompressing the compressed second RAW image read out from the storage medium, and
a third conversion configured to convert the decompressed second RAW image into the first RAW image,
wherein the development processing performs the development processing for the first RAW image obtained by the third conversion.

5. The image processing apparatus according to claim 1, further comprising an image capturing unit.

6. A non-transitory computer readable storage medium storing a program for causing a computer to function as each of the units in the image processing apparatus according to claim 1.

7. An image processing apparatus comprising:
at least one processor; and
a memory storing a program which, when executed by the at least one processor, causes the image processing apparatus to:
execute a fourth conversion configured to convert a RAW image output from an image capturing unit and generate a second RAW image;
compress the second RAW image and generate the compressed second RAW image;
write the compressed second RAW image into a storage medium;
a fifth conversion configured to convert the second RAW image and generate a first RAW image;
a development processing configured to perform development processing for a first RAW image; and
output an image developed by the development processing,
wherein the first RAW image and the second RAW image are respectively images obtained from the same RAW image, and a level of pixels in a dark portion in the second RAW image has been raised more than that in the first RAW image, and wherein the fifth conversion subtracts a value corresponding to a difference between the first RAW image and the second RAW image from the second RAW image, to generate the first RAW image.

8. The image processing apparatus according to claim 7, wherein
the fourth conversion combines first nonlinear conversion and second nonlinear conversion for the RAW image output from the image capturing unit, to generate the second RAW image, and
the fifth conversion subtracts a conversion result of the second nonlinear conversion from the second RAW image, to generate the first RAW image.

9. The image processing apparatus according to claim 7, wherein the fourth conversion changes the degree to which the level of the pixels in the dark portion is raised depending on a feature of the RAW image output from the image capturing unit.

10. The image processing apparatus according to claim 9, wherein the fourth conversion increases the degree to which the level of the pixels in the dark portion is raised as a ratio of the dark portion to the RAW image output from the image capturing unit increases.

11. An image processing method comprising:
a first conversion converting a RAW image output from an image capturing unit and generate a first RAW image;
performing development processing for the first RAW image;
outputting an image generated by the development processing for the first RAW image;
a second conversion converting the RAW image output from the image capturing unit and generate a second RAW image;
compressing the second RAW image and generating the compressed second RAW image; and
performing control to write the compressed second RAW image into a storage medium,
wherein the first RAW image and the second RAW image are respectively images obtained from the same RAW image, and a level of pixels in a dark portion in the second RAW image has been more raised than that in the first RAW image,
wherein a conversion result for the RAW image output from the image capturing unit is combined with the first RAW image, to generate the second RAW image, and
wherein a degree to which the level of the pixels in the dark portion is raised by the first conversion is lower than a degree to which the level of the pixels in the dark portion by the second conversion.

* * * * *